(12) United States Patent
Singh et al.

(10) Patent No.: US 9,227,866 B2
(45) Date of Patent: Jan. 5, 2016

(54) POROUS WASTE GLASS MEMBRANE (75) Inventors: Gurdev Singh, Singapore (SG); James Antony Prince, Singapore (SG); Xiaolong Sun, Singapore (SG)

(73) Assignee: NGEE ANN POLYTECHNIC, Singapore (SG)

( * ) Notice: Subject to any disclaimer, the term of this patent is extended or adjusted under 35 U.S.C. 154(b) by 192 days.

(21) Appl. No.: 14/004,327

(22) PCT Filed: Mar. 14, 2011

(86) PCT No.: PCT/SG2011/000101
§ 371 (c)(1),
(2), (4) Date: Nov. 21, 2013

(87) PCT Pub. No.: WO2012/125119
PCT Pub. Date: Sep. 20, 2012

(65) Prior Publication Data
US 2014/0182334 A1    Jul. 3, 2014

(51) Int. Cl.
*C03B 19/06* (2006.01)
*B01D 67/00* (2006.01)
*B01D 71/04* (2006.01)
*C03B 19/08* (2006.01)
*C03C 1/00* (2006.01)
*C03C 11/00* (2006.01)

(52) U.S. Cl.
CPC ............ *C03B 19/06* (2013.01); *B01D 67/0046* (2013.01); *B01D 71/04* (2013.01); *C03B 19/08* (2013.01); *C03C 1/002* (2013.01); *C03C 11/007* (2013.01); *B01D 2323/08* (2013.01); *B01D 2323/18* (2013.01); *B01D 2323/24* (2013.01)

(58) Field of Classification Search
USPC .......................................... 65/17.5; 428/305.5
IPC .................... C03B 19/06; B01D 67/0046,71/04
See application file for complete search history.

(56) References Cited

U.S. PATENT DOCUMENTS

| 4,657,875 | A | 4/1987 | Nakashima et al. |
| 5,009,688 | A | 4/1991 | Nakanishi |
| 5,928,773 | A | 7/1999 | Andersen |
| 2003/0222025 | A1 | 12/2003 | Archuleta |

FOREIGN PATENT DOCUMENTS

| JP | 10231132 A | 9/1998 |
| WO | WO 03/055815 A1 | 7/2003 |
| WO | WO 2012/125119 A1 | 9/2012 |

OTHER PUBLICATIONS

WIPO Application No. PCT/SG2011/000101, PCT International Search Report, mailed May 25, 2011.
WIPO Application No. PCT/SG2011/000101, Written Opinion of the International Searching Authority, mailed May 25, 2011.
WIPO Application No. PCT/SG2011/000101, International Preliminary Report on Patentability, completed Feb. 14, 2013.

*Primary Examiner* — Mark Halpern
(74) *Attorney, Agent, or Firm* — Alston & Bird LLP (57) ABSTRACT

The present invention disclosed in this application relates to a method for producing glass membranes for filtration purposes. The disclosed method for producing cost effective glass membranes utilizes recycled waste glass, has shorter sintering periods and has lower sintering temperatures.

35 Claims, 6 Drawing Sheets

POROUS WASTE GLASS MEMBRANE

FIELD OF THE INVENTION

This invention relates to a method for producing glass membranes. More particularly, this invention relates to a method for producing glass membranes for filtration purposes. Still more particularly, this invention relates to a method for producing cost effective glass membranes utilizing recycled waste glass, shorter sintering periods and lower sintering temperatures.

PRIOR ART

Membrane filters are widely used in water purification processes for filtering undesirable materials, particles and biological contaminants from contaminated water such as rainwater and sewage. In a water purification process, membrane filters greatly reduce the concentration of particulate matter such as suspended particles, parasites and a range of other materials that may have dissolved into the contaminated water by capturing the particulate matter in the membrane. These filters are also useful for the treatment of contaminated water when it is desired to reuse the filtered water for industrial purposes or for limited domestic purposes.

Currently, polymeric and/or ceramic membranes are commonly used in most industries. One problem with these two types of membranes is the cost of producing the membranes. The cost of producing polymeric membranes is much lower compared to the cost of producing ceramic membranes. However, the poor mechanical strength, poor chemical durability and low temperature resistance of polymeric membranes limit their use in industry and long-term performance/reliability of these membranes. As opposed to polymeric membranes, ceramic membranes have higher mechanical strength, excellent chemical durability, and high temperature resistance making ceramic membranes suitable for use in most harsh conditions, such as water and wastewater filtration.

Ceramic membranes are typically made from materials such as Silica, Alumina, Titania, Zirconia or combinations of these materials. The process to form membranes from these inorganic materials involves a sintering process which involves a step of heating the raw materials in a furnace up to a very high temperature, typically in the range of 1500 to 1800° C. for long periods of time, typically in the range of 24 to 48 hours. These raw inorganic materials are also quite costly. All these factors add together to increase the overall cost of producing ceramic membranes. Thus, the cost of producing ceramic membranes is almost 3 to 5 times more expensive per unit area than the cost of producing polymeric membranes.

A second problem with these types of membranes is the formation of the proper pore size in the body of the membranes for the desired function. For the membrane to function as a filtration apparatus, the sizes of the pores in the membrane have to be carefully formed in accordance to the function served by the membrane. For example, if the glass membrane is to be used to filter microorganisms from contaminated water, the bubble point of the membrane has to be smaller than the size of the microorganism size. Bubble point measurements are commonly known in the art as a measurement method for measuring the largest pore size in the body of a membrane. Therefore, those skilled in the art are constantly striving to find a low cost method to produce membranes that have the durable features of ceramic membranes, having high porosity and good filtration qualities.

It is known in the art that crushed glass particles are a cost-effective replacement for the relatively more expensive inorganic materials commonly used to produce ceramic membranes. Membranes produced from glass particles greatly reduce the cost of the starting materials. Methods used to produce known glass membranes involve the heating of the raw materials to temperatures in excess of 1200° C. for long periods of time and/or combining the glass particles with acidic solutions. A method involving the step of heating raw materials to high temperatures for producing a foamed glass article for filtration purposes is described in US Patent Application Number 2003/0222025, published on 4 Dec. 2003 in the name of John Paul Archuleta. In this document, the foamed glass article is produced by mixing recycled waste glass with finely ground foaming agents and then the mixture is maintained at a temperature range in between 1274° C. and 1700° C. for a period of time. After the glass membrane has foamed to the desired density and pore structure, the temperature of the glass membrane is rapidly reduced to halt the foaming of the glass and to produce the final foamed glass article.

U.S. Pat. No. 5,009,688 issued on 23 Apr. 1991 in the name of Kazuki Nakanishi describes a process for producing porous glass comprising the steps of preparing a reaction solution, hydrolizing and polymerizing specific chemical properties in the solution to obtain a gel, and calcining the gel to obtain porous glass. Further, U.S. Pat. No. 4,657,875 issued on 14 Apr. 1987 in the name of Tadao Nakashima et. al discloses a method for producing a porous glass product having pore sizes in the range of 200 to 10000 nm and having pores of substantially cylindrical shape. The method described in this document comprises the steps of combining glass, calcium carbonate, boric acid, soda ash and magnesia to form a mixture, whereby the mixture is then heated beyond the melting temperature of glass to approximately 1350° C., then alumina powder is added to the softened mixture. Subsequently, the mixture is then heat treated at approximately 740° C. for 20 hours. Successive combinations of acid baths were then applied to the mixture to produce the final porous glass product.

The above-cited art describes methods to produce porous glass articles that may be suitable for use as glass membranes. However, the methods employed by the disclosed prior art involve the steps of maintaining the raw materials at a high sintering temperature, i.e. typically more than 1200° C., for long periods of time; chemical treatment of the raw material and post chemical treatment of the glass membranes. U.S. Pat. No. 5,928,773 issued on 27 Jul. 1999 in the name of James C. Andersen discloses of a simpler method to produce pH neutral foamed glass articles. The method disclosed in this document comprises the steps of mixing pulverized glass particles, foaming agent, binder and water together. The mixture is then heated to a first elevated temperature in the range between 250° C. and 700° C. at a rate of approximately 50° C. per minute and held at that first elevated temperature for a period of time to remove substantially all the moisture and excess organic material from the glass article. The glass article is then heated to a second elevated temperature in the range between 720° C. and 860° C. and held at the second elevated temperature for a period of time to allow the glass particles to fuse together and for the foaming agent to emit the foaming gases. The glass article is then cooled in three cooling steps to avoid cracking and thermal stress. The method disclosed in this document is directed towards the production of foamed glass articles which are to be used as artificial pumice stones in the stone-washed garment industry. Thus, an objective of the method disclosed in this document is to produce a foamed glass article that is substantially pH neutral, i.e. pH values in the range between 7.0 and 8.4. This document does not disclose of a method to produce a highly porous and hydrophilic glass membrane suitable for use in water filtration systems. In particular, this document does describe a method for making a glass article that has homogenously distributed pores within the body of the glass article that are required for a glass membrane in a water filtration system. Thus, there is a need in the art for a process for producing glass membranes that may be used in water filtration systems that are cheaper to produce than the currently used ceramic membranes and more durable than the polymeric membranes.

SUMMARY OF INVENTION

The above and other problems in the art are solved and an advance in the art is made in accordance with this invention. A first advantage of a glass membrane in accordance with this invention is that the glass membrane is able to achieve a porosity of at least 75% even though the pores in the body of the glass membrane are arranged in a manner resembling a tortuous path. A second advantage of a glass membrane in accordance with this invention is that the largest pore size within the glass membrane can be selectively formed in the range between 0.01 μm and 10.0 μm. A third advantage of a glass membrane in accordance with this invention is that the glass particles are adhered together and the size of the glass particles are in a range between 1 μm and 1000 μm. A fourth advantage of a glass membrane in accordance with this invention is the homogeneous distribution of pores within the body of the glass membrane. A fifth advantage of a glass membrane in accordance with this invention is the high throughput or flux that can be achieved through the membrane. Specifically, pure water permeation (PWP) flux of more than 30 000 LMH/bar may be achieved for a membrane with a pore size of 1.5 μm in accordance with this invention.

A method for producing a porous glass membrane in accordance with this invention with embodiments of this invention is performed in the following manner. The method begins by combining crushed glass particles with a foaming agent to form a combination. The combination is then fragmentized to produce a homogeneous mixture. The homogeneous mixture is then combined with a binder and water to produce a slurry. The slurry is then formed into the shape of a glass membrane. The glass membrane is then cured at an ambient room temperature. Subsequently, the glass membrane is heated from the ambient room temperature to a first elevated temperature over a first specified period of time. The glass membrane is then subjected to a sintering step whereby the glass membrane is sintered to a second higher temperature over a second specified period of time. The resulting glass membrane structure is then subsequently cooled.

In accordance with embodiments of this invention, the crushed glass particles comprises of crushed waste glass particle. In accordance with other embodiments of this invention, the foaming agent comprises calcium carbonate. In accordance with some embodiments of this invention, the binder comprises an inorganic binder such as sodium silicate. In accordance with some embodiments of this invention, the combination of crushed glass particles and foaming agent are fragmentized by ball milling to produce an even and homogeneous mixture.

In accordance with some embodiments of the step of forming the shape of the glass membrane from the slurry, the slurry is poured into a mould to produce a glass membrane with a particular shape, a particular thickness and a particular size. The slurry in the mould is then agitated through ultrasound or vibration.

In accordance with some embodiments of the step of curing the glass membrane at an ambient room temperature, the glass membrane is cured for a period of time ranging between 1 hour and 24 hours. The glass membrane is preferably cured in the ambient room temperature for 24 hours.

In accordance with some embodiments of the step of heating the glass membrane from the ambient room temperature to a first elevated temperature, the range of the first elevated temperature is substantially between the temperature range of 50° C. to 90° C. The first elevated temperature is preferably 60° C. When the temperature of the glass membrane reaches that of the first elevated temperature, the glass membrane is then maintained at that first elevated temperature for 2 hours. The heating of the glass membrane from the ambient room temperature to the first elevated temperature is done incrementally over a first specified period of time. The heating rate of the glass membrane is in a range between 2° C. per minute and 5° C. per minute. The heating rate of the glass membrane is preferably 3° C. per minute.

In accordance with some embodiments of the invention, in the step of sintering the glass membrane to a second higher elevated temperature, the range of the second higher elevated temperature is in a temperature range between 700° C. and 1200° C. The glass membrane is maintained at this temperature range for approximately 1-25 hours.

In accordance with some embodiments of the step of sintering the glass membrane to a second higher elevated temperature, the range of the second higher elevated temperature is in a range between 800° C. and 1000° C. The glass membrane is maintained at this temperature range for a period between 5 and 20 hours.

In accordance with some embodiments of the step of sintering the glass membrane from the first elevated temperature to a second higher elevated temperature, the sintering of the glass membrane is done incrementally over a second specified period of time. The sintering rate of the glass membrane is in a range between 0.1° C. per minute and 25° C. per minute. The sintering rate of the glass membrane is preferably in a range between 0.1° C. to 5° C. per minute. The sintering rate of the glass membrane is preferably 3° C. per minute. In this step, the sintering rate of the glass membrane determines the bubble point size of the pores formed in the body of the glass membrane.

In accordance with some embodiments of the step of sintering the glass membrane, the sintering rate of the glass membrane is preferably 2° C. per minute. Further, the second elevated temperature is 900° C. Furthermore, the glass membrane is maintained at this second elevated temperature for 10 hours.

In accordance with some embodiments of the invention, the size of the crushed glass particles are in a range between 1 μm and 1000 μm. The size of the crushed glass particles are preferably between 50 μm±25 μm and 100 μm±25 μm. Furthermore, the bubble point size of the pores in the glass membrane can be determined by choosing the size of the crushed glass particles to be used.

In accordance with some embodiments of the step of combining water to the mixture, the ratio of water to the mixture comprising the glass particles, the foaming agent and binder is in the range between 1:100 and 1:2. The ratio of water to the mixture is preferably 1:10 in this step.

In accordance with some embodiments of this invention, the body of the glass membrane is formed from a mixture that comprises an amount of foaming agent which is 4% by weight, an amount of binder which is in the range between 0.1% and 50% by weight and an amount of glass particles which are in the range between 46% and 95.9% by weight. A preferable mixture includes 6% by weight foaming agent, 8% by weight binder and 86% by weight glass particles.

In accordance with some embodiments, the mixture to form the glass membrane comprises binder which is 12% by weight, foaming agent which is in the range between 0.1% and 15% by weight and glass particles which are in the range between 87.9% and 73% by weight. A preferable combination for the mixture comprises 4% by weight foaming agent, 12% by weight binder and 84% by weight glass particles.

In accordance with some embodiments of the step of forming a slurry, 10 ml of water is added to each 100 gm of the combination comprising the foaming agent, the binder and the glass particles.

BRIEF DESCRIPTION OF THE DRAWINGS

The above advantages and features of a method and apparatus in accordance with this invention are described in the following detailed description and are shown in the drawings.

DETAILED DESCRIPTION

This invention relates to a method for producing glass membranes. More particularly, this invention relates to a method for producing glass membranes for filtration purposes. Still more particularly, this invention relates to a method for producing cost effective glass membranes utilizing recycled waste glass, shorter sintering periods and lower sintering temperatures.

A glass membrane produced in accordance with embodiments of this invention is able to achieve a porosity of at least 75% even though the pores in the body of the glass membrane are arranged in a manner resembling a tortuous path. Furthermore, the largest pore size within the glass membrane can be selectively formed in the range between 0.01 µm and 10.0 µm.

Figure 1:
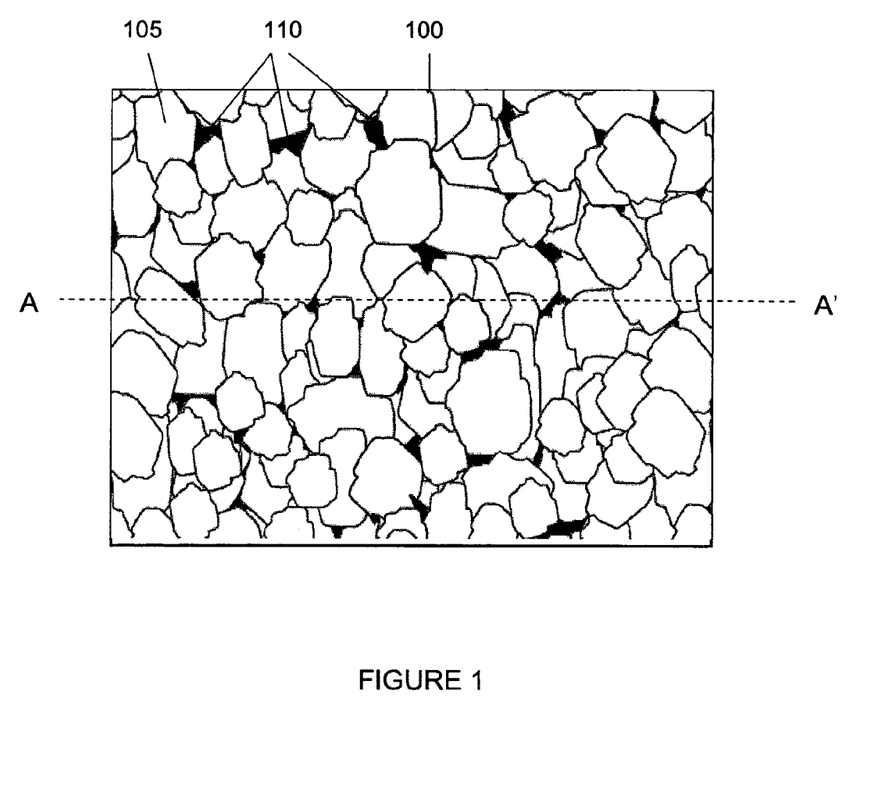
FIG. 1 illustrating a top view of a glass membrane produced in accordance with an embodiment of this invention.

A magnified top view of a glass membrane formed in accordance with an embodiment of this invention is shown in FIG. 1. FIG. 1 illustrates glass particles 105 which are adhered to one another, forming body 100 of the glass membrane. As glass particles 105 are not subjected to heating levels beyond the melting point of glass and as glass particles 105 are not subjected to acid treatments, each grain of glass in glass particles 105 can be seen in FIG. 1. Dispersed between glass particles 105 are pores 110. Pores 110 are formed in body 100 of the glass membrane. Pores 110, which are not identical in size, are distributed substantially homogeneously throughout body 100 of the glass membrane. The homogeneous distribution of the pores ensures that the structure of the glass membrane does not crack or curl after the glass membrane has been subjected to a heating or sintering process. Liquids flowing through body 100 will flow through body 100 following the paths formed by pores 110. Thus, any particles or sediments which are larger than the size of pores 110 will be trapped by body 100.

Figure 2:
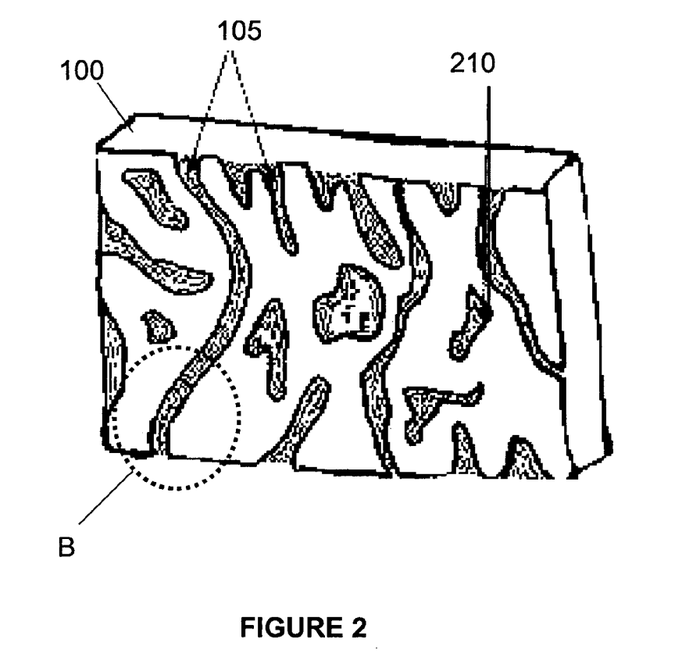
FIG. 2 illustrating a cross sectional view of a glass membrane produced in accordance with an embodiment of this invention.

FIG. 2 illustrates a cross sectional view of body 100 at line A-A' as shown in FIG. 1 of a glass membrane formed in accordance with an embodiment of this invention. The cross sectional view in FIG. 2 shows tortuous paths within body 100 of the glass membrane formed by pores 110. Regardless of the arrangement of pores 110 resembling tortuous paths in the glass membrane, the glass membrane produced in accordance with this invention is able to achieve a porosity of at least 75% and a maximum porosity of approximately 90%. Cavities 210, which are distributed homogeneously across body 100 do not contribute to the porosity of the glass membrane as cavities 210 do not provide a path whereby liquids may flow through. However, the homogeneous formation of cavities 210 through body 100 ensures that the structure of the glass membrane does not crack or curl after the glass membrane has been subjected to a heating or sintering process.

Figure 3:
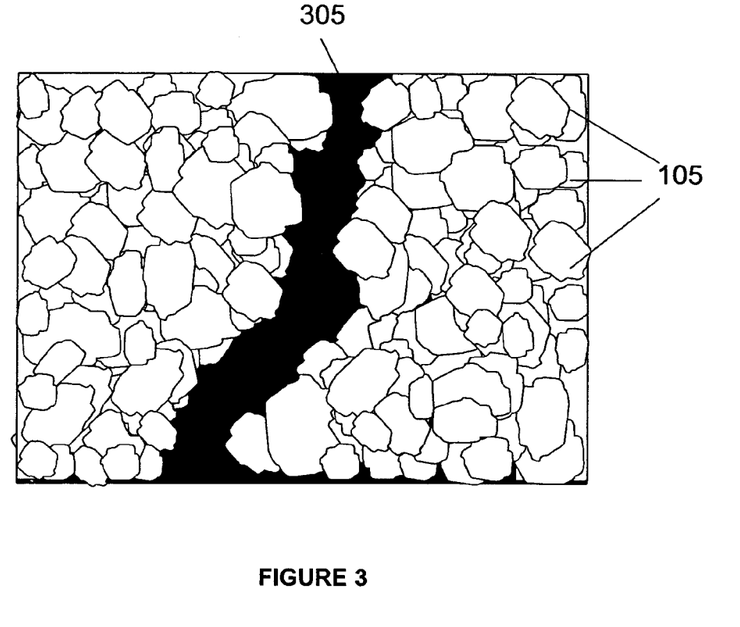
FIG. 3 illustrating a tortuous path formed within the body of a glass membrane produced in accordance with an embodiment of this invention.

FIG. 3 illustrates an enlarged view of B as shown in FIG. 2. Path 305 is an illustrative example of a tortuous path formed by pores 110, which allows liquids to flow from a first end of the glass membrane through to a second end of the glass membrane. Path 305 is surrounded on either side by glass particles 105 which are adhered together using a binder (not shown). The size of the pores can be controlled in accordance with this invention. Hence, the porosity of the glass membrane can be controlled in turn. One skilled in the art will recognize that as path 305 becomes more tortuous, the porosity of the glass membrane will degrade accordingly.

In one embodiment, the glass membrane may comprise of a binder such as sodium silicate, a foaming agent such as calcium carbonate and glass particles such as crushed waste glass. One skilled in the art will recognize that other types of binders, foaming agents and glass particles may be used without departing from this invention. Table 1 below shows the relationship between the pore expansion within the body of the glass membrane, the density of the pores within the body of the glass membrane, the volume of the pores within the body of the glass membrane and the achievable porosity when the concentration of the foaming agent was held constant at substantially 5.88% by weight, the density of waste glass is 2520 kg/m$^3$ and the concentration of the binder and glass particles are varied.

TABLE 1

| Sample | % Binder | % Glass | % Expansion | Density (g/cm$^3$) | Porosity (%) |
|---|---|---|---|---|---|
| A | 4 | 90.12 | 177.1 | 0.615 | 75.6 |
| B | 8 | 86.12 | 265.0 | 0.563 | 77.7 |
| C | 12 | 82.12 | 512.7 | 0.276 | 89.0 |
| D | 16 | 78.12 | 631.9 | 0.246 | 90.2 |
| E | 20 | 74.12 | 555.6 | 0.268 | 89.4 |
| F | 24 | 70.12 | 385.0 | 0.279 | 88.9 |
| G | 28 | 66.12 | 381.0 | 0.317 | 87.4 |
| H | 32 | 62.12 | 384.3 | 0.306 | 87.9 |

Table 2 below shows the relationship between the pore expansion within the body of the glass membrane, the density of the pores within the body of the glass membrane, the volume of the pores within the body of the glass membrane and the achievable porosity when the concentration of the binder was held constant at substantially 11.76% by weight, the density of waste glass is 2520 kg/m$^3$ and the concentration of the foaming agent and glass particles are varied.

TABLE 2

| Sample | % Foaming Agent | % Glass | % Expansion | Density (g/cm$^3$) | Porosity (%) |
|---|---|---|---|---|---|
| 1 | 2 | 86.24 | 304.0 | 0.442 | 82.5 |
| 2 | 4 | 84.24 | 500.7 | 0.299 | 88.1 |
| 3 | 6 | 82.24 | 418.8 | 0.374 | 85.2 |
| 4 | 7 | 81.24 | 239.6 | 0.704 | 72.1 |
| 5 | 9 | 79.24 | 156.0 | 0.953 | 62.2 |

Tables 1 and 2 show that the porosity of the glass membrane depends on the density of the pores, the volume of the pores and the amount of pore expansion within the body the glass membrane. Tables 1 and 2 also show that glass membranes produced in accordance with this invention are able to achieve porosities as high as 90%.

Figure 4:
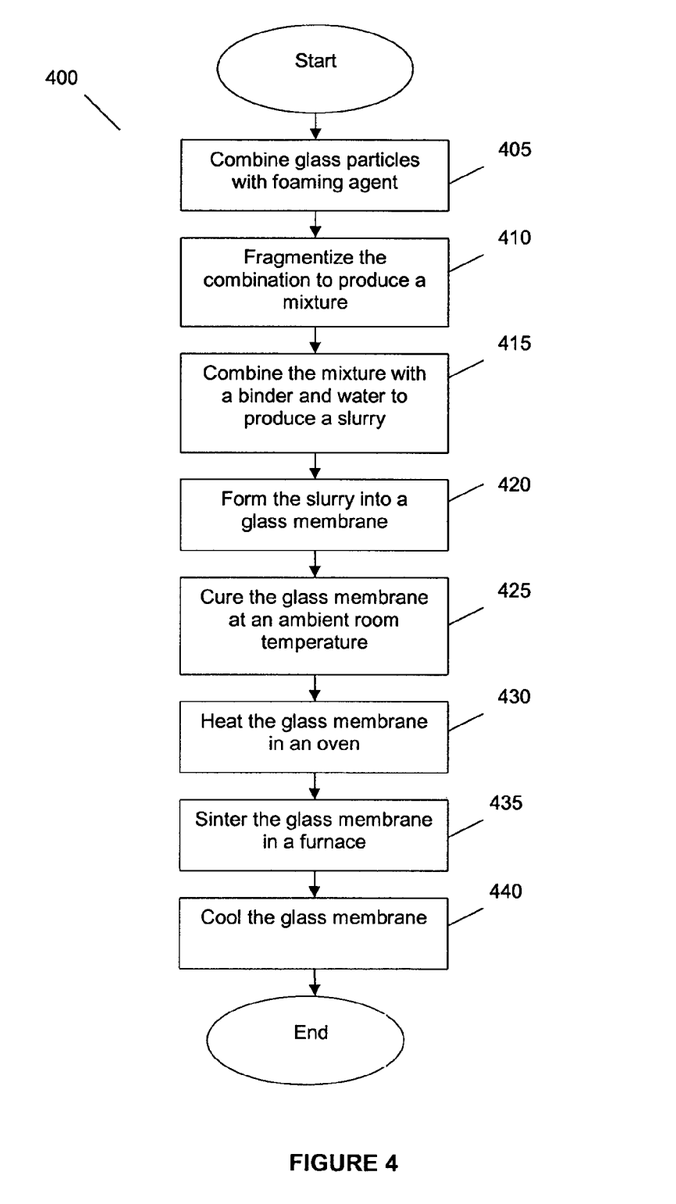
FIG. 4 illustrating a flowchart of a method to produce a glass membrane in accordance with an embodiment of this invention.

A glass membrane in accordance with the invention may be produced by the steps as shown in FIG. 4. Specifically, FIG. 4 illustrates a flowchart of a method to produce a glass membrane formed in accordance with an embodiment of this invention. Process 400 begins by combining glass particles with a foaming agent in step 405. In accordance, with some embodiments, the glass particles comprise crushed waste glass. Furthermore, the foaming agent in step 405 comprises calcium carbonate. One skilled in the art will recognize that the crushed glass particles may be replaced with other types of pulverized glass particles such as crushed foam glass without departing from this invention. The size of the glass particles are in the range between 1 μm and 1000 μm. The size of the glass particles in this embodiment are preferably between 50 μm and 100 μm±25 μm. Glass particles of these sizes may be obtained by crushing waste glass, pulverizing glass articles or other various glass objects. One skilled in the art will also recognize that other compositions of foaming agents may be used without departing from this invention.

The combination of glass particles and foaming agent are then fragmentized together to form a homogeneous mixture in step 410. In accordance with this embodiment, the fragmentizing of the combination is done by ball milling. The ball milling of the foaming agent and glass particles causes the combination to be uniformly distributed. Step 410 results in a glass membrane with a homogenously distributed foaming agent which results in a glass membrane with uniformed porosity. Furthermore, the friction between the foaming agent and the glass particles during the ball milling process contributes to the physical adhesion of the foaming agent onto the glass particles. However, other means for fragmentizing may be used without departing from this invention as long as the fragmentizing substantially distributes the glass particles and foaming agent homogenously throughout the mixture.

In step 415, the homogenous mixture of foaming agent and crushed glass particles are combined with a binder and water to produce a slurry. In accordance with this embodiment, the binder added is an inorganic binder such as sodium silicate. One skilled in the art will recognize that other types of inorganic binders may be added without departing from this invention. In accordance with embodiments of this invention, the ratio of water added to the mixture of glass particles, foaming agent and binder is in a range between 1:100 and 1:2. Preferably, the ratio of water to the mixture of glass particles, foaming agent and binder is 1:10.

The slurry is poured into a mould in step 420 to form the desired shape, size and thickness of the glass membrane. The pouring of the slurry into the mould has to be done carefully to prevent air bubbles from forming. The slurry in the mould may be agitated to remove any air bubbles that may have formed in the mould. The agitation of the slurry may be done by vibrating the slurry in the mould or by applying ultrasound to the slurry. The slurry can also be subjected to other known methods to produce the glass membrane for example, extrusion, tape casting, injection moulding, etc. One skilled in the art will recognize that other means may be used to remove air bubbles from the slurry in the mould without departing from this invention.

In step 425, the glass membrane is left to cure in the mould at an ambient room temperature for a period of time. In this embodiment, the glass membrane is left to cure for a period of time between 1 hour and 24 hours.

The solidified glass membrane is then placed into an oven for further curing in step 430. The glass membrane is gradually heated from an ambient room temperature to a first elevated temperature whereby the first elevated temperature is in the range between 50° C. and 90° C. The glass membrane should not be placed directly into an oven heated to the first elevated temperature. Instead, the temperature of the oven has to be increased gradually from the ambient room temperature to the first elevated temperature over a specified period of time. In accordance with this embodiment, the heating rate of the glass membrane is in a range between 2° C. per minute and 5° C. per minute. In response to the temperature of the glass membrane being heated up to the first elevated temperature, the temperature of the glass membrane is maintained at the first elevated temperature for 2 hours. However, one skilled in the art will recognize that other time periods may be used without departing from this invention. Preferably, the glass membrane is maintained at the first elevated temperature for at least 2 hours. This ensures that the glass membrane is sufficiently dry.

In step 435, the glass membrane undergoes a sintering process. The glass membrane is removed from the oven and placed onto a flat plate for the sintering process. In accordance with some embodiments, non-binding powder with high heat capacity such as aluminium oxide is preferably placed as a layer between the flat plate and the cured glass membrane. The non-binding powder prevents the cured glass membrane from sticking to the flat plate. The flat plate together with the glass membrane is then placed in a furnace for sintering. The transfer of the heated glass membrane to the furnace is done rapidly to ensure that the glass membrane does not cool down too much from the first elevated temperature as the glass membrane is being placed in the furnace. The temperature in the furnace is gradually increased over a specified period of time until the temperature in the furnace increases from the first elevated temperature to a higher second elevated temperature. In response to the temperature of the glass membrane being sintered up to the second elevated temperature, the temperature of the glass membrane is maintained at the second elevated temperature for a period of time.

In one embodiment, when the second elevated temperature is in the range between 700° C. and 1200° C., the glass membrane is sintered within this temperature range for 1 to 25 hours. In another embodiment, when the second elevated temperature is in the range between 800° C. and 1000° C., the glass membrane is sintered within this temperature range for a time period between 5 hours and 20 hours.

In step 435, the sintering temperature applied to the glass membrane is gradually increased at a sintering rate between 0.1° C. per minute and 25° C. per minute. The sintering rate of the glass membrane is preferably in a range between 0.1° C. to 5° C. per minute. The sintering rate of the glass membrane is preferably 3° C. per minute until the glass membrane is heated to the second elevated temperature. The formed glass membrane is then taken out of the oven in step 740 and allowed to cool.

Figure 5:
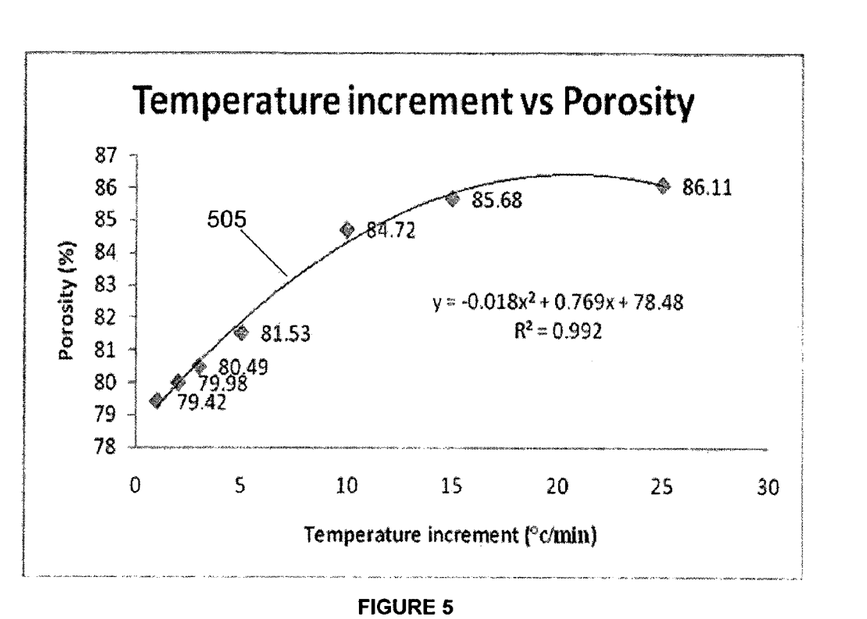
FIG. 5 illustrating the relationship between the porosity of a glass membrane produced in accordance with an embodiment of this invention and the heating rate of the glass membrane.

In steps 430 and 435, the temperature of the oven and the temperature of the furnace were gradually increased over a specified period of time. The rate at which the temperature of the glass membrane increases determines the porosity of the produced glass membrane as shown in FIG. 5. The relationship between porosity and the rate of the temperature increment is shown in line 505 to be of a second order polynomial. As shown in FIG. 5, to produce glass membranes with a porosity of more than 75%, the rate of temperature increase should be in the range between 0.1° C. per minute to 25° C. per minute. From FIG. 5, for optimum porosity, the rate of temperature increase should preferably be in the range between 0.1° C. per minute to 15° C. per minute. Thus, by carefully selecting the rate of temperature increment, the porosity of the glass membrane can be defined.

Figure 6:
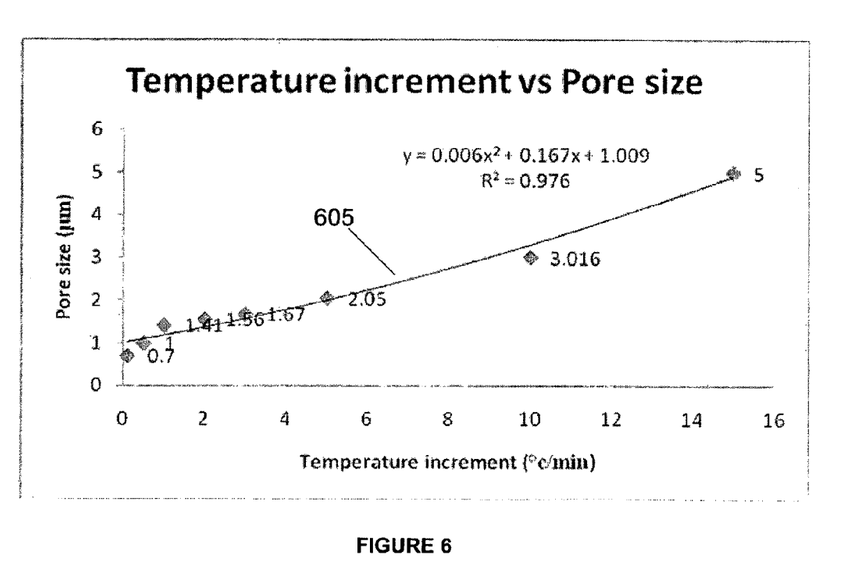
FIG. 6 illustrating the relationship between the sizes of the pores in a glass membrane produced in accordance with an embodiment of this invention and the heating rate of the glass membrane.

FIG. 6 shows the relationship between the largest pore size in the glass membrane and the rate at which the temperature of the glass membrane is increased. From line 605, it can be seen that there is a linear relationship between the size of the pores and the rate of temperature increase. The size of the pores were calculated based on bubble point measurement methods which are well known in the art. The range of bubble point pore sizes achievable for temperature increment rates between the 0.5° C. per minute and 15° C. per minute are shown to be approximately between 0.7 μm and 5.0 μm in size. As shown in this figure, the sizes of the pores in the glass membrane can be defined by controlling the heating rate of the glass membrane. Furthermore, the size of the glass particles has a big effect on the pore size of the membrane. It is understood that if the size of the glass particles are smaller, the size of the pores in the body of the membrane are smaller as well. Hence, in accordance with some embodiments of the invention, it is possible to achieve a membrane with a pore size of 0.01 μm with smaller glass particles. One skilled in the art will recognize that by adjusting the size of the crushed glass particles, other pore sizes are achievable, such as pore sizes between 0.01 μm and 10 μm.

Figure 7:
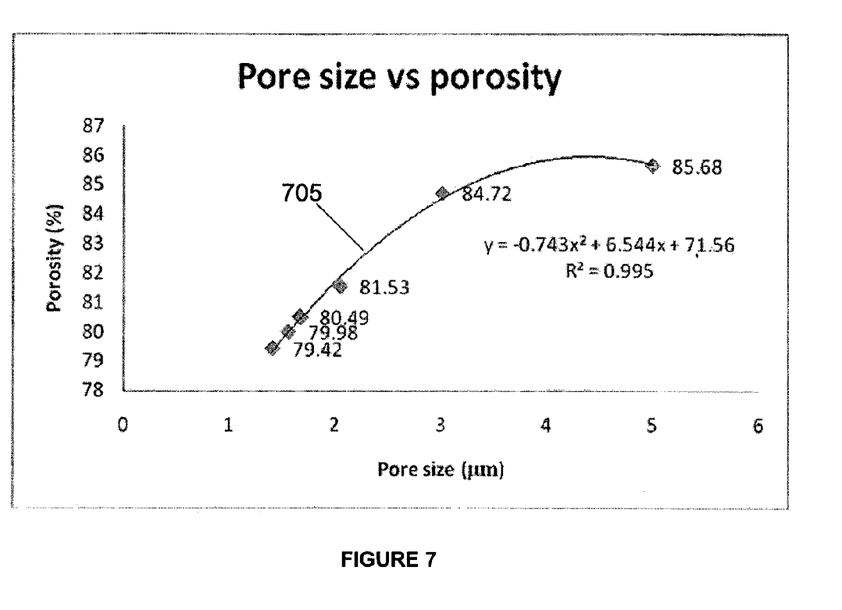
FIG. 7 illustrating the relationship between the porosity of the glass membrane and the sizes of the pores in a glass membrane produced in accordance with an embodiment of this invention.

FIG. 7 shows the relationship between the size of the pores in the glass membrane and the porosity of the glass membrane. Line 705 shows that as the size of the pores increase, the porosity of the glass membrane increases as well. However, once the size of the pores exceeds a particular threshold, the porosity of the glass membrane degrades and no longer increases in accordance with the size of the pores. In this embodiment, as shown in FIG. 7, once the size of the pores expands beyond 4 μm, the porosity of the glass membrane begins to degrade.

Glass membranes produced in accordance with this invention may then be mounted onto flat sheet modules to be used in various filtration applications such as the filtration of wastewater or contaminated domestic water. The flat sheet modules may be made from materials such as plastics, acrylic, Perspex, stainless steel, aluminium, ceramic or any other materials, depending on the application in which the module is to be used in. The glass membrane is then attached to module. A backing material such as a sponge, polyester, foam or any other type of shock absorbing material may be placed between the membrane and the module to reduce the tensile stress applied on the glass membrane when the module is in use. A sealant such as silicon may then be used to hold the glass membrane and the module together. Glass membranes produced in accordance with this invention may also be in tubular form to be used in various filtration applications such as the filtration of wastewater or contaminated domestic water. The tubular glass membranes may be mounted in modules that could be made from materials such as plastics, acrylic, Perspex, stainless steel, aluminium, ceramic or any other materials, depending on the application in which the module is to be used in. The tubular glass membrane is attached to the module. The tubular glass membrane module can be operated both in cross-flow or dead end modes i.e. the tubular glass membrane could have both ends open to water flow or only one end open to water flow. The tubular membrane ends could be potted to the module by using sealants such as silicon, polyurethane resin or epoxy resin.

The following examples illustrate various embodiments of this invention. One skilled in the art will recognize that the examples set out below are not an exhaustive list of the embodiments of this invention.

Example 1

Glass particles and a foaming agent are combined together to form a combination. In this example, the glass particles comprises crushed waste glass obtained from used glass bottles. The waste glass is initially crushed and then milled using a ball mill to prepare a fine powder of glass particles. The glass particles are then sieved to obtain an average glass particle size of 75 μm±25 μm. The combination of the glass particles and the foaming agent are then ball milled to produce a homogeneous mixture. A binder is then dissolved in water and added to the homogenous mixture of glass particles and foaming agent to form a slurry. In this example, the foaming agent used comprises of calcium carbonate and the binder used is an inorganic binder comprising of sodium silicate. The ratio of water added to the mixture comprising of glass particles, binder and foaming agent is 1:10. Specifically, 10 ml of water is added for every 100 gm of the mixture. The slurry is then poured into a mould to form a glass membrane of a particular thickness, size and shape. The pouring of the slurry into the mould has to be carefully done to ensure that air bubbles do not form in the glass membrane in the mould. The slurry is then agitated using ultrasound or vibration to remove any air bubbles that may have formed in the glass membrane. The glass membrane is then left to cure at an ambient room temperature for 10 hours. The cured glass membrane is then placed into an oven. The glass membrane is gradually heated from the ambient room temperature to 60° C. at a heating rate of 3° C. per minute. Once the glass membrane is heated to 60° C., the glass membrane is maintained at this temperature for 1 hour. The solidified glass membrane is then removed from the oven and placed onto a flat plate for the sintering step. A layer of non-binding powder with high heat capacity such as aluminium oxide may be placed as a layer between the plate and the solidified glass membrane to prevent the glass membrane from sticking to the plate. The flat plate and the glass membrane are then inserted into the furnace for the sintering process. This step is done rapidly to ensure that the temperature of the solidified glass membrane remains at about 60° C. when the glass membrane is placed into the furnace. The glass membrane is then sintered from 60° C. to 900° C. at a sintering rate of 3° C. per minute. Once the glass membrane reaches the temperature of 900° C., the glass membrane is sintered for 10 hours. Finally, the glass membrane is cooled down to an ambient room temperature. The glass membranes produced were found to be crack free and defect free.

Example 2

The method for producing a glass membrane in accordance with this invention is similar as example 1. However, the amount of foaming agent added is 4% by weight, the amount of binder added in the range between 0.1% and 50% by weight and the amount of glass particles added is in the range between 46% and 95.9% by weight.

Example 3

The method for producing a glass membrane in accordance with this invention is similar as example 1. However, the amount of foaming agent added is 6% by weight, the amount of binder added is 8% by weight and the amount of glass particles added is 86% by weight.

Example 4

The method for producing a glass membrane in accordance with this invention is similar as example 1. However, the amount of binder added is 12% by weight, the amount of foaming agent added in the range between 0.1% and 15% by weight and the amount of glass particles added is in the range between 87.9% and 73% by weight.

Example 5

The method for producing a glass membrane in accordance with this invention is similar as example 1. However, the amount of foaming agent added is 4% by weight, the amount of binder added is 12% by weight and the amount of glass particles added is 84% by weight.

The glass membrane produced in accordance with example 1 is mounted on a module and the performance of the glass membrane as a liquid filtration apparatus was tested. Water from a water treatment plant was used in the following tests.

In the first test, the pure water flux obtained through the membrane is measured and the data is shown in Table 3 below.

TABLE 3

| Suction Pressure (kPa) | Pure Water Flux (L/m² hr) |
|---|---|
| 5.06 | 1725 |
| 8.44 | 3225 |
| 11.8 | 4675 |

A suction force of 5.06 to 11.8 kPa was used in this measurement. From Table 3, it is shown that the water flux per bar of the membrane is approximately between 34,090 to 39,620 $L/m^2$ hr/bar. The water flux per bar is obtained by taking the pure water flux divided by the suction pressure.

In the second test, water contaminated with white clay particles having a mesh size of 200 was used whereby the mesh size of 200 corresponds to an average particle size of about 74 μm. The concentration of the white clay particles in the water was about 5% by weight and the initial turbidity of the water is about 400 NTU. The module with the glass membrane is immersed into the contaminated water and a constant suction pressure of 5.06 kPa is applied. The flux of the contaminated water through the glass membrane was measured to be 1700 $L/m^2$ hr and the slight drop in the flux was possibly due to the fouling of the pores on the surface of the glass membrane. The water obtained from this filtration process was found to be substantially free of clay particles and the turbidity of the water was found to be less than 0.2 NTU. This is the turbidity of tap water. None of the clay particles were found in the water as measured by particle counter. Therefore 100% of the clay particles are rejected. Hence, the glass membrane produced in accordance to an embodiment of this invention performs as an effective apparatus for the filtration of clay particles.

In the third test, domestic waste water collected from a water treatment plant was used. The glass membrane module was immersed into the domestic waste water and a suction pressure of 5.06 kPa was used. The levels of contaminants monitored in the domestic waste water were the total organic carbon (TOC), total dissolved solids (TDS) and turbidity. The flux of the domestic waste water through the glass membrane was measured to be 1500 $L/m^2$ hr. Water filtered through the glass membrane was then collected and the concentration of the contaminants in the filtered water was measured and is shown in Table 4 below. Table 4 shows that the glass membrane effectively rejects a substantial amount of contaminants from the domestic waste water.

TABLE 4

| Contaminant | Feed Concentration | Permeate Concentration | % Rejection |
|---|---|---|---|
| Total Organic Carbon (mg/L) | 150 | 7.59 | 94.9 |
| Total Dissolved Solids (mg/L) | 480 | 171.3 | 64.4 |
| Turbidity (NTU) | 130 | 3 | 97.8 |

In the fourth test, the rejection capability of the glass membrane over an extended period of use was examined. The glass membrane module was immersed in a tank containing domestic waste water. Suction pressure of approximately 0.04 bar or 4 kPa of suction pressure was applied to the glass membrane module. The collected water that has been filtered by the glass membrane is measured at specific intervals. The measured flux through the membrane and the quality of the filtered water is shown in Tables 5 and 6 below respectively.

TABLE 5

| Time (hr) | Flux through membrane (L/m² hr) |
|---|---|
| 0 | 480 |
| 1 | 51.4 |
| 2 | 25.7 |
| 4 | 10.3 |
| 18 | 5.7 |
| 22 | 4.7 |
| 26 | 4.0 |

As shown in Table 5, as the glass membrane was left undisturbed through the entire testing period, the measured flux through the glass membrane decreased over time. This occurs as fouling of the surface of the glass membrane increased over time. Over the period of 24 hours, 450 liters of water per unit area of membrane were filtered by the glass membrane when the suction pressure applied to the membrane module was 4 kPa.

TABLE 6

| Time | Feed - Domestic Wastewater | | | Filtered Water | | |
|---|---|---|---|---|---|---|
| (hours) 0 | TOC (mg/L) | TDS (mg/L) | Turbidity (NTU) | TOC (mg/L) | TDS (mg/L) | Turbidity (NTU) |
| 1 | 157.5 | 478 | 128 | 16.12 | 180.4 | 4.19 |
| 2 | 157.5 | 478 | 128 | 16.21 | 218.3 | 4.08 |
| 4 | 157.5 | 478 | 128 | 17.6 | 241.6 | 4.49 |
| 18 | 157.5 | 478 | 128 | 17.81 | 168.5 | 3.86 |
| 22 | 157.5 | 478 | 128 | 18.89 | 171.9 | 4.77 |

Table 6 shows the quality of the water after the domestic waste water has been filtered by the glass membrane module. As shown in this table, the rejection of the TOC is between 88% and 90%, TDS removal ranges between 49% and 67% and turbidity removal ranges between 96% and 97%. These results show that the rejection capability of the glass membrane is consistent over a period of time.

In a fifth test, the glass membrane module produced using methods described above of pore size 1.5 µm was immersed in a solution containing *E-Coli* bacteria. The initial bacterial count in the solution was $8.25 \pm 0.26 \times 10^9$ CFU/mL. The solution was filtered through the glass membrane module and the filtered water was collected. The bacteria count in the filtered solution was found to be $2.06 \pm 0.18 \times 10^6$ CFU/mL. This works out to more than 3-log removal of bacteria. Therefore the removal of bacteria is greater than 99.9%. Higher removal rate of bacteria can be easily achieved by reducing the pore size of the membrane by methods described above.

These tests show that a glass membrane produced in accordance with an embodiment of this invention acts as an effective filtration device for particles as small as micro-organisms. Such a glass membrane also possesses the durable characteristics of ceramic membranes at a fraction of the cost of ceramic membranes.

The above is a description of a glass membrane for use in a water filtration system and a method for making the membrane. It is foreseen that those skilled in the art can and will design alternative embodiments of this invention as set forth in the following claims.

The invention claimed is:

1. A method for forming a highly porous glass membrane comprising the steps of:
   combining glass particles with a foaming agent to form a combination;
   fragmentizing said combination to produce a homogeneous mixture;
   combining said homogeneous mixture with a binder and water to produce a slurry;
   forming said slurry into a glass membrane;
   curing said glass membrane at an ambient room temperature;
   heating said glass membrane from said ambient room temperature to a first elevated temperature over a first specified period of time
   sintering said glass membrane from said first elevated temperature to a second elevated temperature over a second specified period of time wherein said step of sintering said glass membrane comprises:
   incrementing said sintering heat applied to said glass membrane at a rate substantially between 0.1° C. per minute and 15° C. per minute to form pores of a predetermined size in said glass membrane; and
   cooling said glass membrane.

2. The method according to claim 1 wherein said glass particles comprises crushed waste glass.

3. The method according to claim 1 further comprising: crushing glass to obtain said glass particles having a size in a range substantially between 1 µm and 1000 µm.

4. The method according to claim 1 further comprising: crushing glass to obtain said glass particles having a size that is substantially between 50 µm±25 µm and 100±25 µm.

5. The method according to claim 4 further comprising the step of: adjusting said sizes of pores formed in said glass membrane by adjusting sizes of said crushed glass particles.

6. The method according to claim 1 wherein said foaming agent comprises calcium carbonate.

7. The method according to claim 1 wherein fragmentizing of said combination comprises:
   ball milling said combination.

8. The method according to claim 1 wherein said binder comprises sodium silicate.

9. The method according to claim 1 wherein a ratio of water to said mixture and binder is in a range substantially between 1:100 and 1:2 in said combining step.

10. The method according to claim 1 wherein the ratio of water to said mixture and binder is substantially 1:10 in said combining step.

11. The method according to claim 1 wherein the step of forming said glass membrane comprises:
    pouring said slurry into a mould to form said glass membrane having a particular shape and a particular size.

12. The method according to claim 1 further comprising: agitating said slurry in said mould.

13. The method according to claim 12 wherein said step of agitating said slurry comprises:
    applying ultrasound to said slurry in said mould.

14. The method according to claim 12 wherein said step of agitating comprises:
    vibrating said slurry in said mould.

15. The method according to claim 1 wherein said step of curing said glass membrane further comprises:
    maintaining said glass membrane at said ambient room temperature for a period of time in a range between 1 hour and 24 hours.

16. The method according to claim 1 wherein said step of curing said glass membrane further comprises:
    maintaining said glass membrane at said ambient room temperature for 24 hours.

17. The method according to claim 1 wherein said first elevated temperature is substantially between the range of 50° C. to 90° C.

18. The method according to claim 1 wherein said first elevated temperature is substantially 60° C.

19. The method according to claim 1 further comprising the step of maintaining said glass membrane at said first elevated temperature for substantially 2 hours in response to said glass membrane being heated to said first elevated temperature.

20. The method according to claim 1 wherein said step of heating said glass membrane from said ambient room temperature to said first elevated temperature over said first specified period of time comprises: incrementing said heat applied to said glass membrane at a rate in a range between 2° C. per minute and 5° C. per minute over said first specified period of time.

21. The method according to claim 1 wherein said step of heating said glass membrane from said ambient room temperature to said first elevated temperature over said first specified period of time comprises:

incrementing said heat applied to said glass membrane at a rate of substantially 3° C. per minute over said first specified period of time.

22. The method according to claim 1 wherein said second elevated temperature is in a range substantially between 700° C. and 1200° C.

23. The method according to claim 22 further comprising the step of maintaining said glass membrane at said second elevated temperature for a specified period time in response to said glass membrane being sintered to said second elevated temperature.

24. The method according to claim 23 wherein said specified period of time for maintaining said temperature is substantially between 1 hour and 25 hours.

25. The method according to claim 1 wherein said second elevated temperature is in a range substantially between 800° C. and 1000° C.

26. The method according to claim 25 further comprising the step of maintaining said glass membrane at said second elevated temperature for a specified time period in a range substantially between 5 and 20 hours in response to said glass membrane being sintered to said second elevated temperature.

27. The method according to claim 1 wherein the step of sintering said glass membrane from said first elevated temperature to said second elevated temperature over said second period of time comprises:
incrementing said sintering heat applied to said glass membrane at a rate substantially 2° C. per minute.

28. The method according to claim 27 wherein said second elevated temperature is substantially 900° C.

29. The method according to claim 28 further comprising the step of maintaining said glass membrane at said second elevated temperature for substantially 10 hours in response to said glass membrane being sintered to said second elevated temperature.

30. The method according to claim 1 wherein said combining step comprises: adding substantially 4% by weight said foaming agent;
adding an amount of said binder in a range substantially between 0.1% and 50% by weight; and
adding an amount of glass particles in a range substantially between 46% and 95.9% by weight glass particles.

31. The method according to claim 1 wherein said combining step comprises: adding substantially 6% by weight foaming agent; adding substantially 8% by weight binder; and adding substantially 86% by weight glass particles.

32. The method according to claim 1 wherein said combining step comprises: adding substantially 10 ml of water per 100 gm of; said, binder, said foaming agent and said glass particles.

33. The method according to claim 1 wherein said combining step comprises: adding substantially 12% by weight binder,
adding an amount of foaming agent substantially in a range between 0.1% and 15% by weight; and
adding an amount of glass particles in a range substantially between 87.9% to 73% by weight.

34. The method according to claim 1 wherein said combining step comprises:
adding substantially 4% by weight foaming agent;
adding substantially 12% by weight binder;
and adding substantially 84% by weight glass particles.

35. The method according to claim 1 wherein the step of sintering said glass membrane is at a rate of increment substantially between 0.1° C. per minute and 15° C. per minute to form pores of a predetermined size substantially between 0.7 μm and 5.0 μm, in which said pores are uniformly distributed across said glass membrane.

* * * * *